(12) United States Patent
Schlipf et al.

(10) Patent No.: US 10,618,626 B2
(45) Date of Patent: Apr. 14, 2020

(54) WING FOR AN AIRCRAFT HAVING A SIMPLIFIED MOVABLE AERODYNAMIC SURFACE AND A FLEXIBLE SEALING

(71) Applicant: Airbus Operations GmbH, Hamburg (DE)

(72) Inventors: Bernhard Schlipf, Hamburg (DE); Dort Daandels, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 236 days.

(21) Appl. No.: 15/718,974

(22) Filed: Sep. 28, 2017

(65) Prior Publication Data
US 2018/0118329 A1   May 3, 2018

(30) Foreign Application Priority Data

Oct. 28, 2016 (EP) .................................... 16196415

(51) Int. Cl.
*B64C 9/02* (2006.01)
*B64C 9/14* (2006.01)

(52) U.S. Cl.
CPC .................. *B64C 9/02* (2013.01); *B64C 9/14* (2013.01); *B64C 2009/143* (2013.01)

(58) Field of Classification Search
CPC ........ B64C 9/02; B64C 9/14; B64C 2009/143
USPC ........................................................ 244/214
See application file for complete search history.

(56) References Cited

U.S. PATENT DOCUMENTS

| 4,361,299 A | * | 11/1982 | Sharrock | B64C 9/16 244/216 |
| 5,311,706 A | * | 5/1994 | Sallee | E04C 3/005 52/2.18 |
| 5,839,698 A | * | 11/1998 | Moppert | B64C 3/50 244/217 |

(Continued)

FOREIGN PATENT DOCUMENTS

| EP | 2282931 A1 | 2/2011 |
| FR | 812036 A | 4/1937 |

(Continued)

OTHER PUBLICATIONS

English Translation of FR 812,036 to Bosseau (provided by Applicant in IDS dated Dec. 11, 2017). (Year: 1937).*

(Continued)

*Primary Examiner* — Claude J Brown
(74) *Attorney, Agent, or Firm* — Lorenz & Kopf LLP (57) ABSTRACT

A wing for an aircraft includes a wing structure attachable to a body of an aircraft, at least one high lift body movably supported at the wing structure, a drive unit coupled with the wing structure and the high lift body and adapted to move the high lift body relative to the wing structure in a chord-wise direction between a retracted position and an extended position, and a sealing device coupled with the high lift body and the wing structure. The high lift body comprises at least one outer edge facing to the wing structure, which at least one outer edge creates a gap to the wing structure at least in an extended position. The sealing device includes a flexible sealing body, which seals the intermediate space between the high lift body and the wing structure in extended positions of the high lift body.

11 Claims, 5 Drawing Sheets

(56) References Cited

U.S. PATENT DOCUMENTS

| | | | |
|---|---|---|---|
| 6,276,641 B1* | 8/2001 | Gruenewald | B64C 3/48 244/213 |
| 6,789,769 B2 | 9/2004 | Mau et al. | |
| 8,919,703 B2* | 12/2014 | Parker | B64C 7/00 244/130 |
| 2007/0241236 A1 | 10/2007 | Whitehouse et al. | |
| 2007/0252040 A1* | 11/2007 | Kordel | B64C 7/00 244/123.1 |
| 2012/0261517 A1* | 10/2012 | Turner | B64C 7/00 244/203 |
| 2015/0083867 A1* | 3/2015 | Moser | B64C 13/16 244/214 |
| 2016/0137284 A1* | 5/2016 | Turner | B64C 3/48 244/1 N |

FOREIGN PATENT DOCUMENTS

| | | |
|---|---|---|
| WO | 2005000672 A1 | 1/2005 |
| WO | 2012114047 A1 | 8/2012 |

OTHER PUBLICATIONS

Niu, "Airframe Structural Design, Practical Design Information and Data on Aircraft Structures", 1988 Conmilit Press Ltd., Eighth printing, Jan. 1995, p. 303.

* cited by examiner

WING FOR AN AIRCRAFT HAVING A SIMPLIFIED MOVABLE AERODYNAMIC SURFACE AND A FLEXIBLE SEALING

CROSS-REFERENCE TO PRIORITY APPLICATION(S)

This application claims the benefit of, and priority to, European patent application number 16196415.0, filed Oct. 28, 2016.

TECHNICAL FIELD

Embodiments of the disclosed subject matter relate to a wing for an aircraft, an aircraft having such a wing, as well as the use of a sealing device.

BACKGROUND

Currently used and known concepts for providing high lift devices on a wing of an aircraft are usually based on movable aerodynamically shaped profiles. These profiles may be realized as reinforced panels or other wing sections, which are selectively moved to different positions through the use of a drive system. A drive system usually includes actuators and kinematic elements, like rods, linkages and tracks with rails and carriages. High lift systems often include movable elements at a leading edge as well as at a trailing edge. Throughout many decades, several different concepts have evolved, which utilize different flaps and leading edge slats. Through moving the respective high lift devices, a resulting surface area, a resulting camber as well as the existence and size of gaps is adjustable, thereby influencing the lift coefficient of the wing.

For improving the overall aerodynamic characteristics of the wing, high lift components are usually designed to have a certain shape that allows to influence the air flow as harmonic as possible. Additional installations are sometimes used to provide a further improvement of the aerodynamic characteristics regarding drag and noise. However, these aerodynamic devices require a certain installation space and a related manufacturing effort.

For example, U.S. Patent Publication 2007/0241236 shows an aircraft having a wing defining an aerofoil surface, the wing comprising a drooped leading edge flap being moveable between a stowed position and a deployed position, wherein the wing is so arranged that during flight when the high-lift device is in the deployed position, air may flow through an opening in the wing and over the aerofoil surface. During flight, air preferably flows into the boundary layer on the upper surface of the wing. This energizes the boundary layer, aft of the trailing edge of the drooped leading edge flap increasing its stability allowing the maximum achievable lift coefficient to be increased and hence reducing aircraft take-off and approach speeds.

Still further, U.S. Pat. No. 6,789,769 shows a slat selectively extendable from a main wing body, with a concave rear surface of the slat facing a convex forward nose surface of the wing body, with a slat gap therebetween. Flexible bristles are movably arranged relative to the lower rear edge of the slat, to flexibly protrude up into the slat air gap, which bristles are flexibly self-positioning and self-contouring due to the aerodynamic forces acting thereon, to improve the air flow conditions through the slat gap, separate the slat gap airflow from an entrapped eddy vortex on the concave rear surface of the slat, and thereby reduce the aerodynamic noise generated along the slat gap.

BRIEF SUMMARY

Certain embodiments of the invention provide a high lift system for a wing of an aircraft, a high lift device movably arranged at a wing of an aircraft, and/or a wing of an aircraft having such a high lift system or device, which lead to a reduction in manufacturing effort, a reduction of a required installation space, a reduction of complexity as well as maintaining or improving the aerodynamic characteristics.

Various benefits and objectives are met by a wing for an aircraft having the features of independent claim 1. Advantageous embodiments and further improvements may be gathered from the sub-claims and the following description.

It is proposed a wing for an aircraft, comprising a main wing structure fixedly attachable to a body of an aircraft, at least one high lift body movably supported at the main wing structure, a drive unit coupled with the main wing structure and the at least one high lift body and adapted to move the at least one high lift body relatively to the main wing structure in a substantial chordwise direction between a retracted position and at least one extended position and a sealing device coupled with the at least one high lift body and the main wing structure. The at least one high lift body comprises at least one outer edge facing to the main wing structure, which edge creates a gap to the main wing structure at least in an extended position. The sealing device comprises a flexible sealing body, which seals the intermediate space between the at least one high lift body and the main wing structure at least in extended positions of the at least one high lift body.

The main wing structure is a main structural, load carrying component of a wing. It may be designed in a box-like manner having at least two spars running in a spanwise direction, which are coupled with a plurality of parallelly arranged ribs. A skin surrounds this arrangement of ribs and spars. A part of this construction may be sealed in order to serve as a fuel tank. The material and the design of the main wing structure depends on the general design philosophy of the respective aircraft and may utilize metallic material as well as fiber-reinforced materials.

The at least one high lift body may be a single component or a plurality of components, which are attached to a plurality of different positions or regions of the main wing structure. For example, the at least one high lift body may be a leading edge high lift body arranged in a leading edge region of the wing. Also, the at least one high lift body may be a trailing edge flap arranged at a trailing edge region of the wing. A combination of these different components may also be possible. Additionally, also flaps and spoilers may be present, which are arranged at an upper or a lower surface of the main wing structure and which are designed according to the core aspects of the invention.

In the following description, some exemplary embodiments of a high lift body are given, which serve as examples and are not intended to limit the scope or application of the described subject matter to any one of these. However, due to the use of the sealing device further explained below, the at least one high lift body may comprise a much more simple and smaller construction compared to commonly used high lift bodies.

The sealing body may be a surface-like, flexible element, which allows to be pulled over a gap between the at least one high lift body and the main wing structure and which allows to remain there when held on at least two sides. It may be particularly feasible to use a foil made from a plastics material. Additionally, reinforcement fibers or wires may be integrated therein. For example, a polyaramide foil or a foil reinforced with polyaramide fibers is advantageous. Also, a polyaramide fabric together with a polychloroprene coating is feasible. Still further, a polyester fabric is a feasible material.

The drive unit for moving the at least one high lift body relative to the main wing structure may be arbitrarily chosen, as long as it is capable of conducting the task of moving the at least one high lift body relative to the main wing structure. For example, the drive unit may comprise a fluid actuator, such as a hydraulic actuator. As an alternative, the drive unit may comprise an electric actuator, such as an electric motor mechanically coupled with a gear. The required extension and retraction velocities may depend on the desired installation position and size of the respective high lift body. Commonly, they are not necessarily high for the task of high lift generation. It may therefore be feasible to use an actuator with a substantially arbitrary motion speed.

The drive unit may be self-locking, such that an acquired position of the drive unit remains when the drive unit is switched off. The self-locking feature may be an intrinsic feature of the drive unit, such as in a spindle gear with a certain thread pitch. However, the self-locking feature may be realized in form of a separate device, such as with a separately operable locking unit or a brake.

Still further, the drive unit may include a guide device that is able to guide the at least one high lift body along a desired motion path. This may be the case with a spindle gear, where at least a part of the high lift device to be moved may be held on the spindle or a nut engaging the spindle.

However, the drive unit may also be a separate device, which moves the high lift device along a separate guide device.

In this regard it is noted that the retracted position as mentioned above is to be considered a position, in which the at least one high lift body substantially closes the contour of the wing in order to form a clean wing. A retracted position is a position, in which the at least one high lift device is moved away from the clean wing or retracted position.

An embodiment of the wing according to the invention lies uses the sealing device, which comprises a flexible sealing body for sealing an intermediate space between the at least one high lift body and the main wing structure in extended positions of the at least one high lift body. The flexible sealing body in these positions extends between the at least one high lift body and the main wing structure, such that this intermediate space is basically closed. In other words, the intermediate space is covered by a flexible sealing element, that avoids an airflow transverse to the surface of the sealing body. For this purpose, the sealing body should be air-impermeable.

This leads to a simplified design of the at least one high lift body, since the actively movable part of the high lift body may be dimensioned smaller, while the aerodynamic characteristics of the combination of high lift body and sealing device are improved at the same time.

In an advantageous embodiment, the at least one high lift body comprises a nose body providing a movable leading edge for the wing. The nose body may be designed as simple as a bull nose, i.e. a rounded edge. Particularly with a nose body, an intermediate space between an upper trailing edge of the nose body and the associated leading edge of the wing structure, which faces to the upper trailing edge of the nose body, may be covered by a sealing body. Consequently, at least an upper section of the wing will comprise a closed flow surface, while the lower surface may optionally be closed as well.

In a further advantageous embodiment, the at least one high lift body comprises a flap providing a movable trailing edge of the wing. Here, the at least one high lift body may provide a translational motion relative to the wing structure, which leads to a gap between the wing structure and the flap. A part of this gap may be covered by a spoiler, an air brake or another similar component, while at least a part of the intermediate space between the wing structure and the flap may be covered by said sealing body. Of course it is possible to provide the trailing edge flap in addition to the leading edge nose body and vice versa.

In a further advantageous embodiment, the sealing device comprises a retraction device attachable to one of the at least one high lift body and the wing structure, wherein the retraction device is adapted for selectively releasing and storing the flexible sealing body in the one of the high lift body and the wing structure. This allows to selectively expand the area to be sealed by the sealing body for preventing the fluttering of an excess length of the sealing body. The retraction device may be realized based on a variety of different operation principles. For example, the sealing body may simply be retractable through pulling it into the main wing structure or a hollow space of the at least one high lift body. While the latter may comprise a rather small free space, it may be feasible to include the retraction device in the main wing structure. The sealing body may be stored through rolling, winding, folding or other processes.

In a preferred embodiment, the retraction device is a winding device, which comprises a rotatably supported winding reel for winding up or unwinding the sealing body. Of course, the sealing body must be designed for this purpose, i.e. by being sufficiently flexible to allow a rollability or windability, respectively. The winding reel may be driven by a motor or through a passive device, such as a spring.

The sealing body may comprise a plurality of longitudinal stiffening elements attached to an inner side of the sealing body and substantially extending along a spanwise direction. These stiffening elements may be realized as stringers comparable to common stringers attached to an inner side of a wing skin. However, due to the considered retraction the stiffening elements may comprise a more flat profile. The stiffening elements provide a stiffening function for the sealing body, such that at least in a lateral direction, i.e. parallel to the leading edge and/or the trailing edge, a bending of the sealing body is substantially adjusted. In order to allow a rollability/windability or foldability, the stringers may preferably comprise a flat profile, which should extend as little as possible in a direction perpendicular to the sealing body.

In a preferred embodiment, the retraction device is adapted for providing a tensioning force onto the sealing body in at least one extended position of the at least one high lift body. By providing a certain tensioning force onto the sealing body, the shape of the sealing body can be influenced. For example, the sealing body may be pulled tight, which will support its shape through pretension. Further, a potential fluttering tendency of the sealing body is substantially avoided.

However, in case a certain camber of the wing in the region of the at least one high lift body is required, pulling the sealing body straight should be avoided. As an alternative to merely pulling the sealing body straight, the extension of the sealing body between the at least one high lift body and the main wing structure may exceed the distance between the at least one high lift body and the main wing structure. Hence, an overlength of the sealing body is present, which is flown over by air. As this air flow leads to a certain suction force, the sealing body will assume a certain profile shape. By controlling the excess length of the sealing body, the profile shape is controllable to a certain extent.

As a further measure, at least a profile body may be provided, which profile body is movably supported on the main wing structure, wherein the at least one profile body is arranged on a suction side of the sealing body, such that it is pressed against the at least one profile body when pulled out from the main wing structure. For example, a single or a plurality of profile bodies may be placed above the sealing body, such that the sealing body is able to be pressed against the sealing body. The at least one profile body then determines the overall shape of the sealing body and the wing, respectively.

In order to support the shape of the sealing body, a plurality of inflatable tubes are provided, which are substantially arranged in a chordwise direction and at a distance to each other. Preferably, the tubes are self-inflating. For allowing air to enter the tubes, the tubes may comprise a valve at a front region facing to the leading edge high lift body. Particularly when a winding device is used to wind up the sealing device, the tubes will be emptied and flattened.

Furthermore, the winding device may comprise a spring mechanism, which is adapted for pulling the sealing body, such that it provides a tension onto the sealing body. The sealing body is then released by simply moving the at least one high lift body and stored by simply retracting the high lift body.

In a particularly preferred embodiment, the stringers may be inflatable, such that they comprise a flattened stowage state and an inflated use state. The inflation may be conducted actively, i.e. through an inflation device, which may be in a fluid communication with the inflatable stringers. As an alternative, the inflatable stringers may be coupled with an air inlet that is in fluid communication to an exterior of the sealing body, such that when an airflow is present, the stringers are passively inflated. For example, an air inlet facing into the flight direction may receive a flow of air, which is lead to the inflatable stringers. In case the sealing body is stored through winding it up, the inflatable stringers are compressed, such that the air is pressed out and they assume their flattened stowage state.

The drive unit is adapted for moving the at least one high lift body in a first direction. In a further advantageous embodiment, the wing comprises an auxiliary drive unit, which is adapted for moving the at least one high lift body in a second direction, which differs from the first direction, independently from the drive unit. In this case, the at least one high lift body conducts a motion, in which the individual motions induced by the drive unit and the auxiliary drive unit are superposed. For example, the auxiliary drive unit may be arranged directly in the at least one high lift body and be adapted for adjusting an angle of the at least one high lift body in relation to the air flow. If the high lift body is a nose body, the second direction may be a downward direction, which allows the nose body to be drooped.

In another embodiment, the sealing body may comprise a plurality of holes, which are arranged in at least a rearward part of the sealing body, i.e. in a region which is extended only close to or at a fully extended position of the high lift body. This allows to provide similar technical effects as a common gap between the main wing structure and the high lift body, i.e. to let flow with a high flow energy pass from one side of the wing to the other, preferably in order to delay stall.

BRIEF DESCRIPTION OF THE DRAWINGS

Other characteristics, advantages and potential applications of the disclosed subject matter result from the following description of the exemplary embodiments illustrated in the figures. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
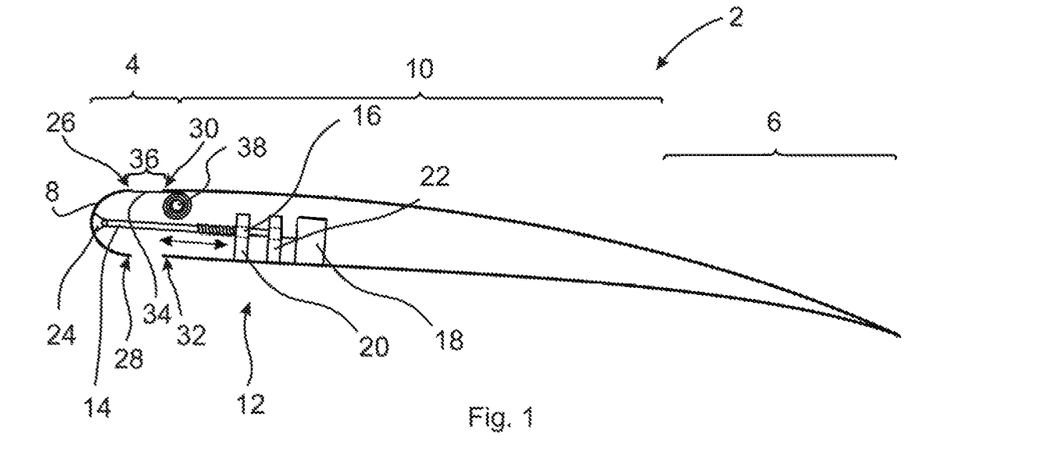
FIG. 1 shows a first exemplary embodiment in a side view.

FIG. 1 shows a wing 2 in a side view. The left side of the drawing plane illustrates a leading edge region 4, while on the right side of the drawing plane, a trailing edge region 6 is shown. For the sake of simplified illustration, the interior of the wing 2 is substantially empty and the outer contour of the wing 2 is simplified.

In this exemplary embodiment, a nose body 8, which is arranged in the leading edge region 4, is separated from a main wing structure 10, which is the main structural part of the wing 2 attachable to a fuselage of an aircraft. As stated in the above description of the invention, the main wing structure 10 comprises a certain interior design, which provides a mechanical stability.

The nose body 8 is coupled with a drive unit 12, which exemplarily comprises a spindle 14, at least one nut 16 and a motor 18. The spindle 14 extends from the motor 18 to the nose body 8 and is supported by exemplarily two support beams 20 and 22, which are mechanically fixed to the main wing structure 10.

By rotating the motor 18, the spindle 14 rotates and induces a motion along the nut 16 along its extension axis. The orientation of the spindle 14 and, resultantly, the direction of linear motion, may be chosen to meet the needs for moving the nose body 8. To avoid a rotation of the nose body 8, a certain support 24 may be arranged on an inner side of the nose body 8.

Nose body 8 comprises an upper trailing edge 26 as well as a lower trailing edge 28, which together enclose a C-shaped profile. Furthermore, the main wing structure 10 comprises an upper leading edge 30 as well as a lower leading edge 32, which both face to the nose body 8. A sealing body 34 extends between the upper trailing edge 26 and the upper leading edge 30, wherein in this illustration the nose body 8 is in an extended position. Hence, a gap 36 between the upper trailing edge 26 and the upper leading edge 30 is closed by the sealing body 34.

Figure 2:
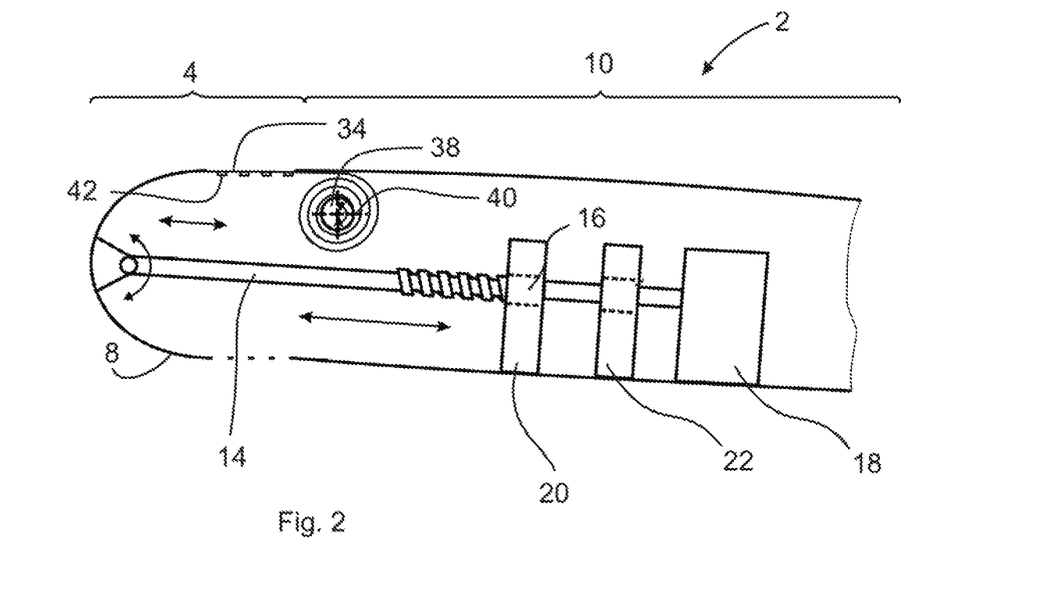
FIG. 2 shows a detail of the first exemplary embodiment in a side view.

As more apparent in FIG. 2, the sealing body 34 is wound up in a winding reel 38, which is able to rotate around a winding axis 40 to selectively release or store the sealing body 34. Hence, by extending the nose body 8, the sealing body 34 may be released through covering the gap 36 with increased dimensions.

It is advantageous if the winding device 40 comprises a spring mechanism (not shown), which is constantly urging the sealing body 34 onto the winding reel 38. This is indicated by an arrow in clockwise direction of the winding reel 38.

Figure 3:
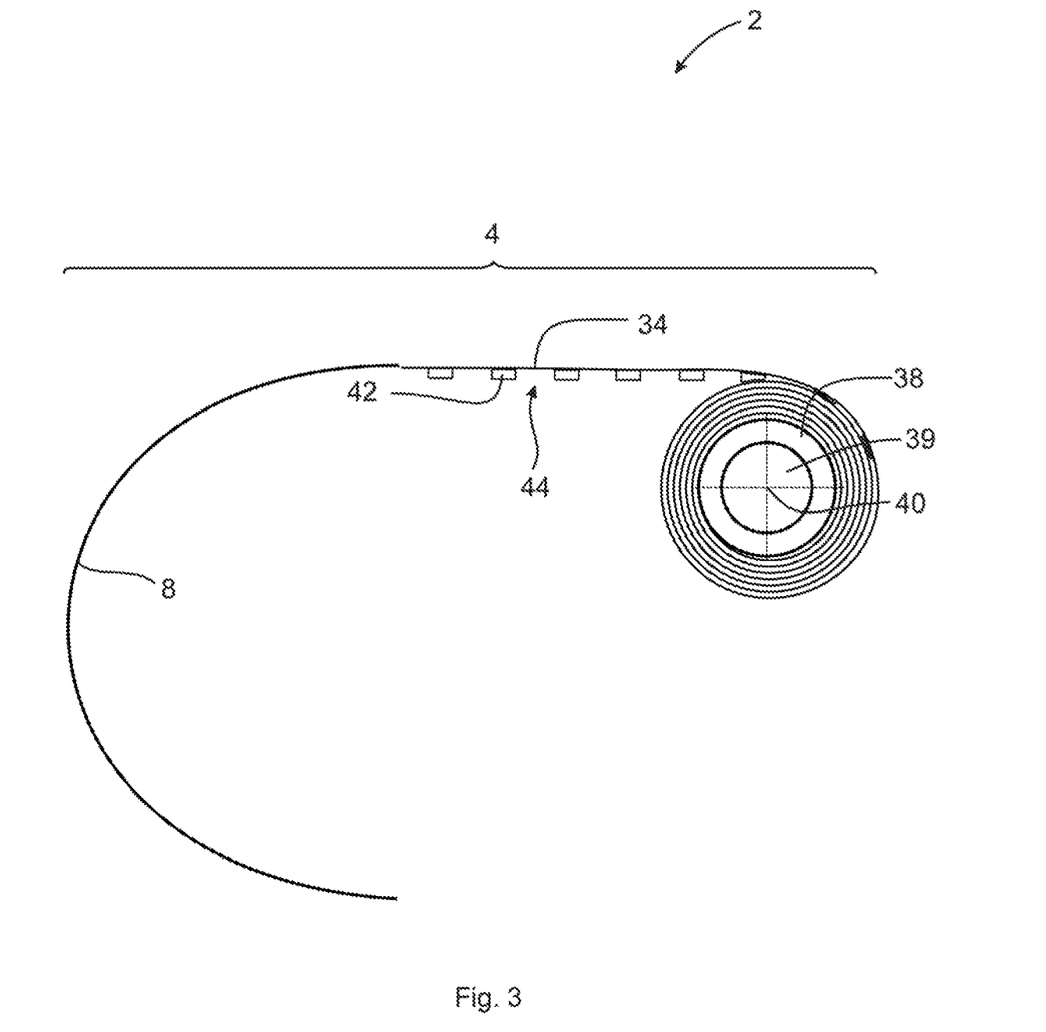
FIG. 3 shows a further embodiment.

As even more apparent in FIG. 3, the sealing body 34 comprises a plurality of flat stringers 42, which are arranged on an inner side 44 of the sealing body 34. These allow to improve the stability of the sealing body 34 in a direction perpendicular to the drawing plane. The stringers 42 may thus extend parallel to the winding axis 40.

The winding reel 38 may be coupled with a retraction device or a winding device 39, which is able to rotate the winding reel 38 in order to store or release the sealing body 34.

Figure 4A:
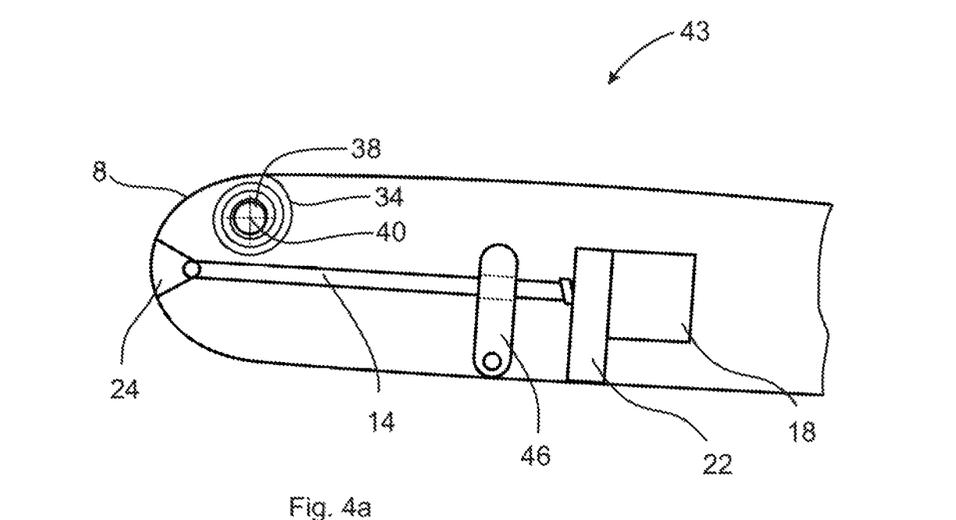
FIGS. 4*a* and 4*b* show a further exemplary embodiment with a droop kinematics.
Figure 4B:
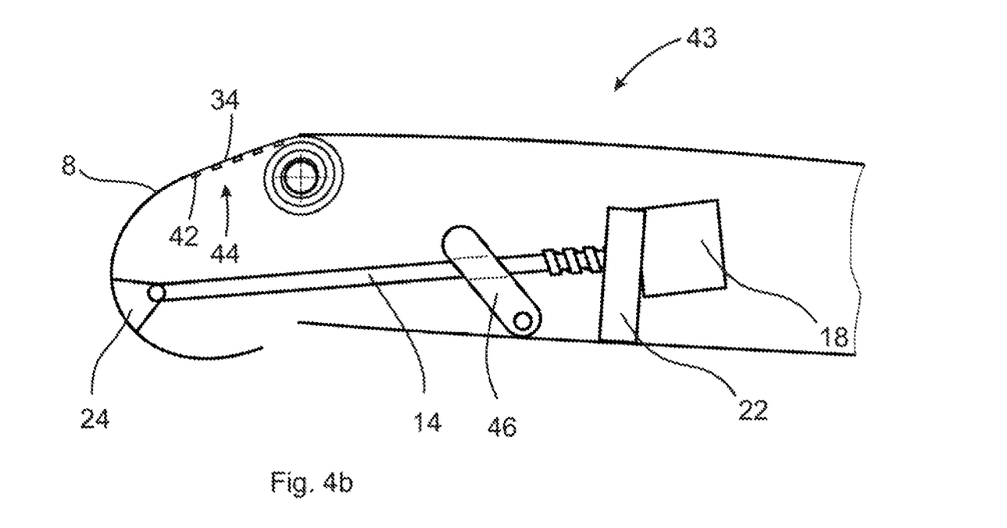

In FIGS. 4a and 4b another exemplary embodiment is shown, which is based on the exemplary embodiment shown in FIGS. 1 and 2. Here, the spindle 14 is guided by a swivably mounted support beam 46, which is swivably mounted in the interior of the wing. The swivably mounted support beam 46 may comprise a swivably mounted bearing, which is indicated by the dashed lines in the swivably mounted support beam 46, through which bearing the spindle 14 extends. The nose body 8 is again coupled with a drive unit 12, is driven by a motor 18. The spindle 14 extends from the motor 18 to the nose body 8 through the support beam 22 and the swivably mounted support beam 46. Once the spindle 14 is forwarded, the swivably mounted support beam 46 swivels in a way that the spindle 14 and the nose body 8 are lowered. Hence, the wing has a droop nose. In this example the sealing body 34 linearly extends between the upper leading edge 30 to the upper trailing edge 26 of the nose body 8. While FIG. 4a shows a retracted position, FIG. 4b shows an extended position. The sealing body 34 in this case has an angle of approximately 20-25° to the sealing body 34 in FIG. 2. The nose body 8 is moved downwardly.

Figure 5:
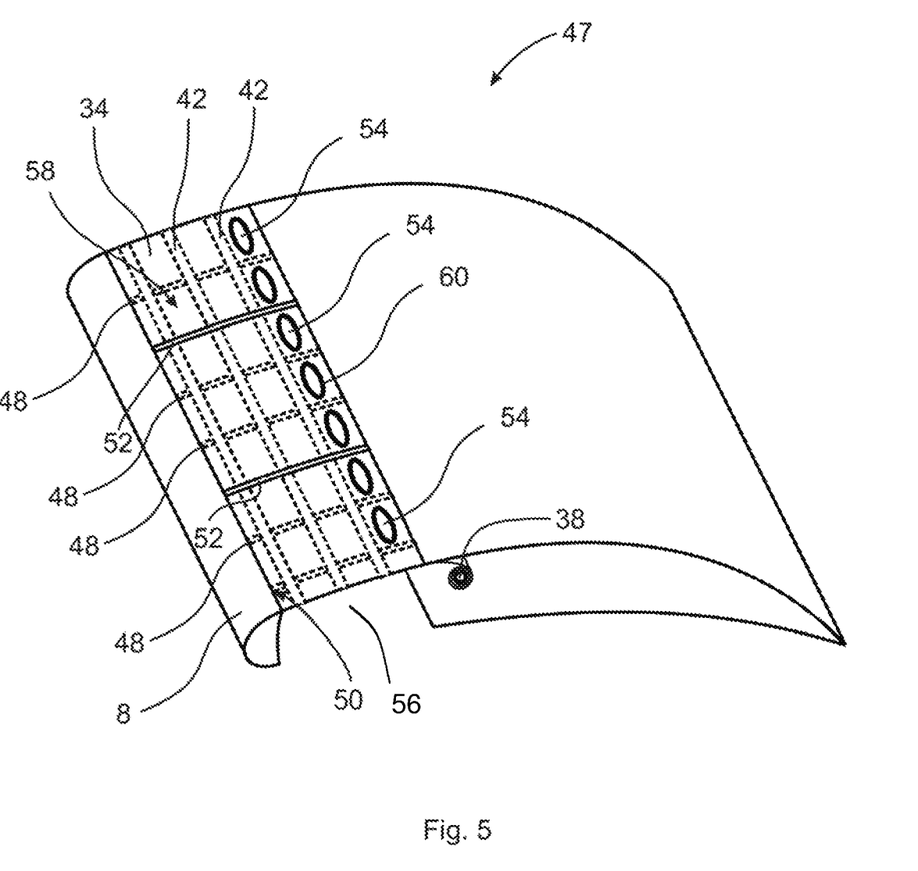
FIG. 5 shows an exemplary embodiment with spanwise stiffeners and chordwise tubes in a spatial view.

FIG. 5 shows a part of a wing in a spatial direction. Here, a plurality of spanwise stiffening elements in the form of stringers 42 are shown, which are sewn into the sealing body 34. Further, chordwise inflatable tubes 48 are arranged at a distance to each other and substantially extends along the whole chordwise extension of the sealing body 34. At a front region 50 they may each comprise a valve (not shown) that allows to inflate the tubes 48 and to maintain a certain fluid pressure. They are openable to release the pressure again, thereby allowing to retract the sealing body 34 again.

As another feature chordwise profile bodies 52 are used, which are extendable separately or together with the sealing body 34. These allow to let the sealing body 34 rest on an underside of the profile bodies when air flows over the upper surface of the sealing body 34 and creates a suction force on the sealing body 34.

At an end of the sealing body 34 in close proximity to the main wing structure 10, several flow openings 54 are present, which allow an energetic flow of air to pass from an underside 56 to an upper side 58 of the wing, e.g. in order to delay stall. The openings 54 comprise a reinforced foil or rim 60.

Figure 6A:
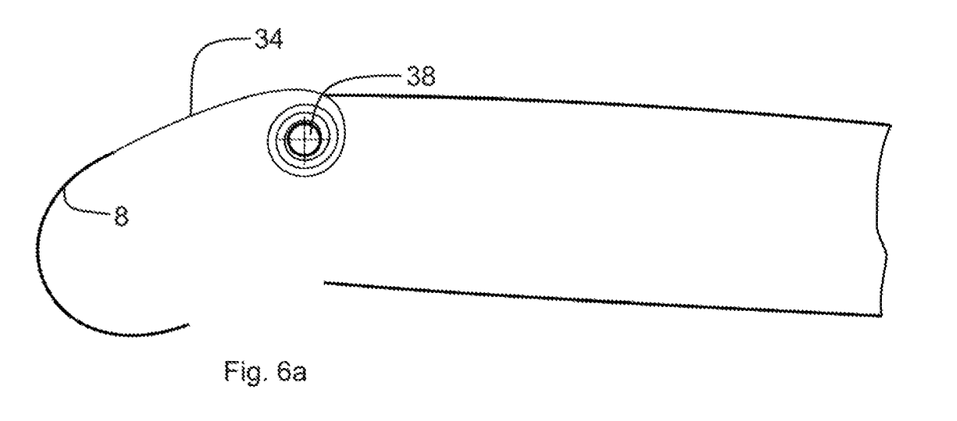
FIGS. 6*a* to 6*c* show different exemplary embodiments with varying lengths of sealing bodies.
Figure 6B:
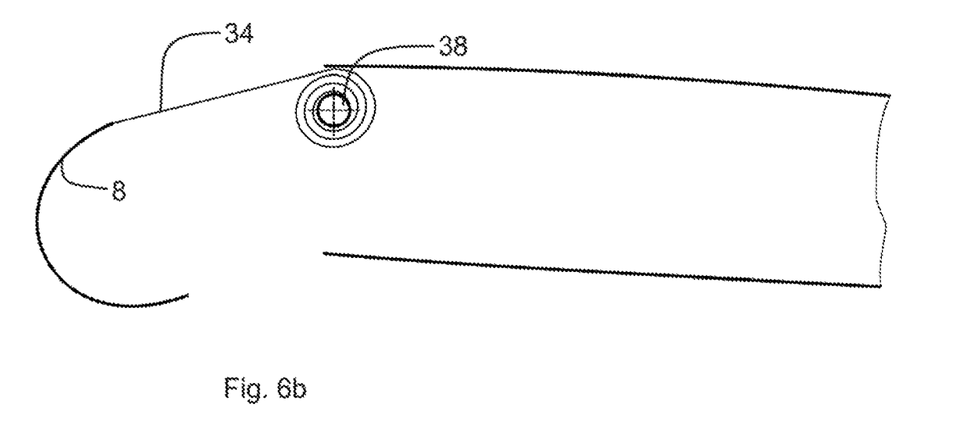
Figure 6C:
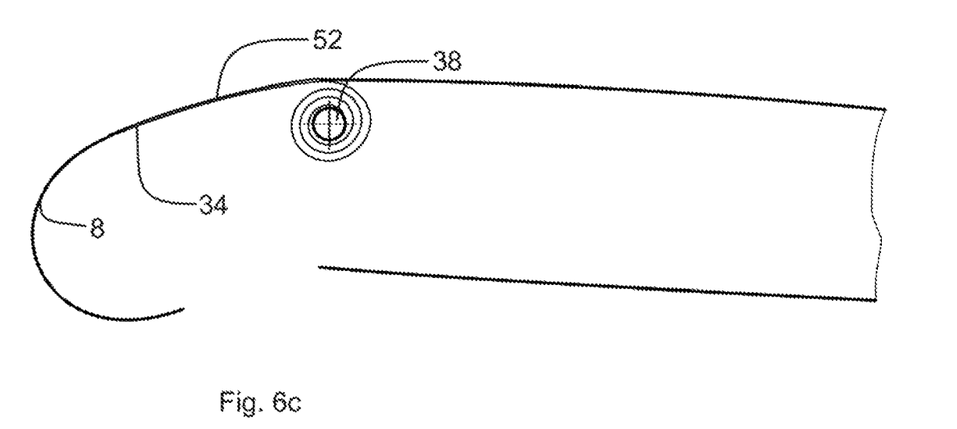

Finally, FIGS. 6a to 6c show various options for realizing the sealing body 34. In FIG. 6a the sealing body 34 comprises an excess length, which allows to provide a certain bulging once a suction force occurs on the upper side through the surrounding air flow. Hence, a certain shape of the wing including the nose body 8 and the sealing body 34 may be reached.

FIG. 6b shows a sealing body 34, which is pulled straight after extending the nose body 8. The resulting overall shape is somewhat angular.

FIG. 6c resembles the exemplary embodiment from FIG. 5, where profile bodies 52 are used for limiting the bulging of the sealing body 34.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A wing for an aircraft comprising:
   a main wing structure fixedly attachable to a body of an aircraft;
   at least one high lift body movably supported at the main wing structure;
   a drive unit coupled with the main wing structure and the at least one high lift body and adapted to move the at least one high lift body relative to the main wing structure in a substantial chordwise direction between a retracted position and at least one extended position;
   a sealing device coupled with the at least one high lift body and the main wing structure; and
   at least one profile body movably supported on the main wing structure;
   wherein the at least one high lift body comprises at least one outer edge facing the main wing structure, which at least one outer edge creates a gap to the main wing structure at least in an extended position;
   wherein the sealing device comprises a flexible sealing body, which seals the gap between the at least one high lift body and the main wing structure in extended positions of the at least one high lift body; and
   wherein the at least one profile body is arranged on a suction side of the sealing body, such that it is pressed against the at least one profile body when pulled out from the main wing structure.

2. The wing according to claim 1, wherein the at least one high lift body comprises a nose body providing a movable leading edge of the wing.

3. The wing according to claim 1, wherein the at least one high lift body comprises a flap providing a movable trailing edge of the wing.

4. The wing according to claim 1, wherein the sealing device comprises a retraction device attachable to one of the high lift body and the main wing structure, and wherein the retraction device is adapted for selectively releasing and storing the sealing body in the one of the high lift body and the main wing structure.

5. The wing according to claim 4, wherein the retraction device is a winding device comprising a rotatably supported winding reel for winding up or unwinding the sealing body.

6. The wing according to claim 1, wherein the sealing body comprises a plurality of longitudinal stiffening elements attached to an inner side of the sealing body and substantially extending along a spanwise direction.

7. The wing according to claim 5, wherein the winding device comprises a spring mechanism, which is adapted for pulling the sealing body straight, such that it provides a tension onto the sealing body.

8. The wing according to claim 6, wherein the longitudinal stiffening elements are inflatable, such that they comprise a flattened stowage state and an inflated use state.

9. The wing according to claim 1, further comprising a plurality of inflatable tubes, which are substantially arranged in a chordwise direction and at a distance to each other.

10. The wing according to claim 1, further comprising an auxiliary drive unit, which is adapted for moving the at least one high lift body in a second direction independently, which second direction differs from a first direction caused by the drive unit.

11. An aircraft having a fuselage and a wing attached to the fuselage, the wing comprising:
a main wing structure fixedly attachable to a body of the aircraft;
at least one high lift body movably supported at the main wing structure;
a drive unit coupled with the main wing structure and the at least one high lift body and adapted to move the at least one high lift body relative to the main wing structure in a substantial chordwise direction between a retracted position and at least one extended position;
a sealing device coupled with the at least one high lift body and the main wing structure; and
at least one profile body movably supported on the main wing structure;
wherein the at least one high lift body comprises at least one outer edge facing the main wing structure, which at least one outer edge creates a gap to the main wing structure at least in an extended position;
wherein the sealing device comprises a flexible sealing body, which seals the gap between the at least one high lift body and the main wing structure in extended positions of the at least one high lift body; and
wherein the at least one profile body is arranged on a suction side of the sealing body, such that it is pressed against the at least one profile body when pulled out from the main wing structure.

* * * * *